United States Patent
Moses et al.

[15] 3,702,565
[45] Nov. 14, 1972

[54] METHOD FOR MEASURING THE HEIGHT OF ATMOSPHERIC AEROSOL AIR

[72] Inventors: Harry Moses, Park Forest; Delbert N. Eggenberger, Downers Grove; Steven L. Halverson, Chicago Heights; William W. Managan, Wheaton, all of Ill.

[73] Assignee: The United States of America as represented by the United States Atomic Energy Commission

[22] Filed: Sept. 21, 1970

[21] Appl. No.: 74,039

[52] U.S. Cl. ................................................. 73/170 R
[51] Int. Cl. ................................................. G01w 1/00
[58] Field of Search. 73/170; 250/435 R, 435 D, 83.3 H

[56] References Cited

UNITED STATES PATENTS 3,134,104 5/1964 Murphree et al. ..... 250/83.3 X
3,508,046 4/1970 Anton ........................ 250/435

Primary Examiner—Jerry W. Myracle
Assistant Examiner—Herbert Goldstein
Attorney—Roland A. Anderson

[57] ABSTRACT

A method of measuring the depth of the aerosol-contaminated layers of air (aerosol layer) is presented. Measurements are made of solar radiation at vertically displaced positions and the height of the aerosol layer calculated from the measurements. The measurements can be made by two displaced instruments at two zenith distances, by two pairs of vertically displaced instruments with one instrument of each pair receiving radiation of a first wave length and the other instrument of each pair receiving radiation of a second wave length or by two vertically displaced instruments with a third instrument positioned centrally therebetween. The height of aerosol layers separated by clear layers is also determined.

9 Claims, 6 Drawing Figures

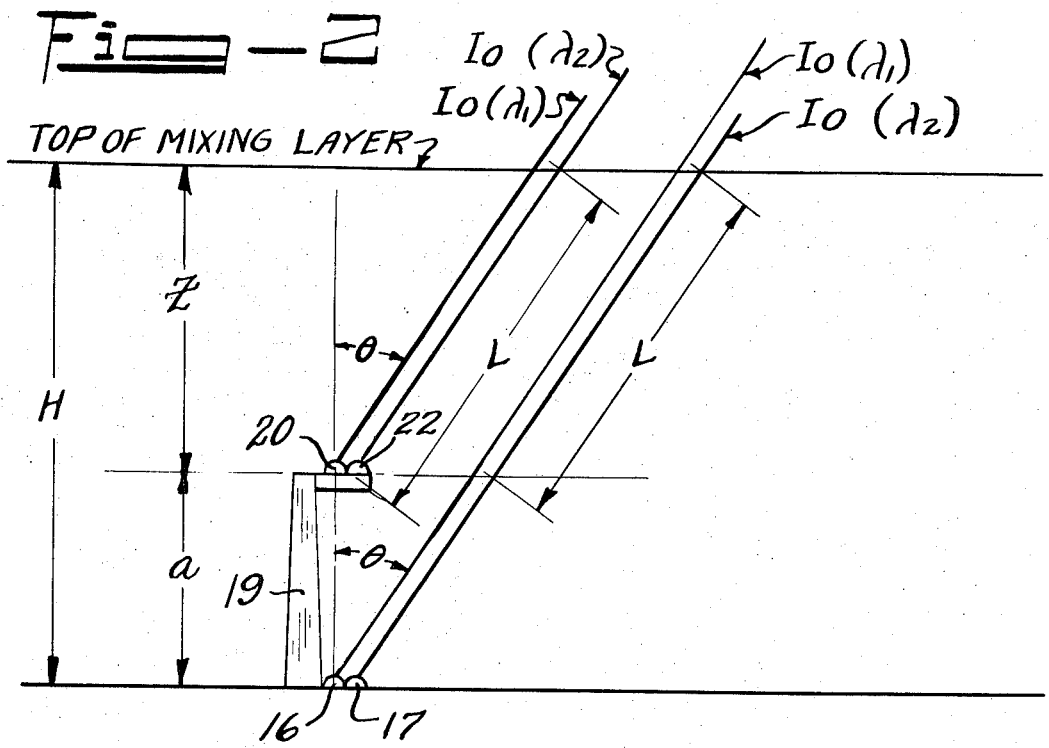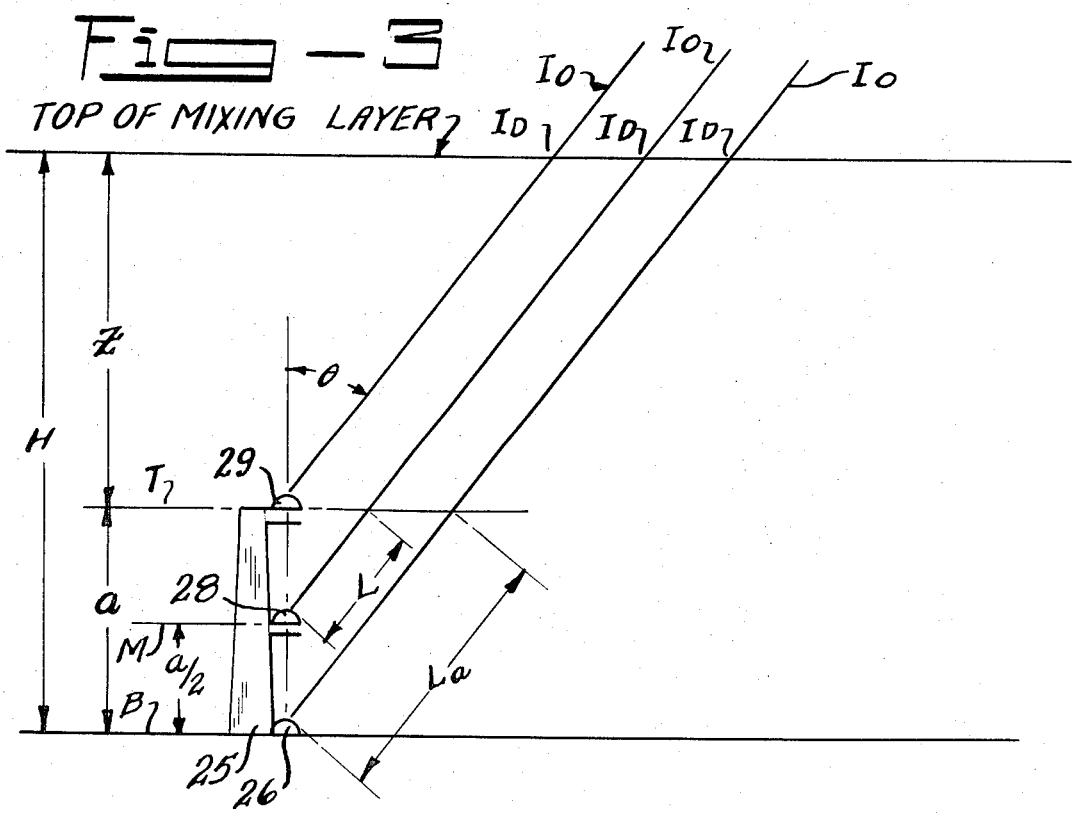

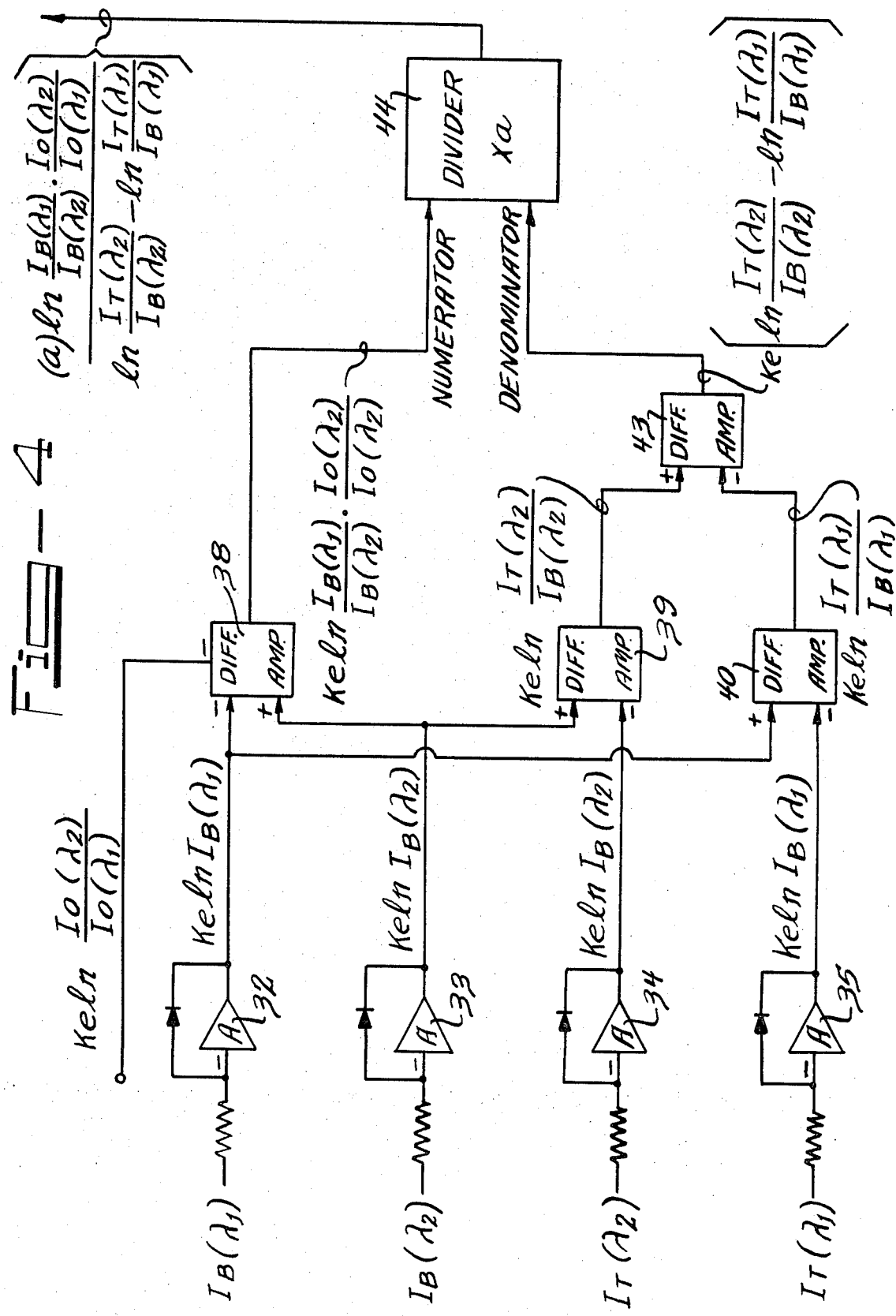

METHOD FOR MEASURING THE HEIGHT OF ATMOSPHERIC AEROSOL AIR

CONTRACTUAL ORIGIN OF THE INVENTION

The invention described herein was made in the course of, or under, a contract with the United States Atomic Energy Commission.

BACKGROUND OF THE INVENTION

When one approaches an industrialized urban area either by aircraft or by automobile, a pall of pollution is readily discernible. The emission of pollutants into the urban atmosphere coupled with meteorological processes such as diffusion, transport, or convection controls the height of this pollution or atmospheric aerosol layer. If the mixing depth is small, levels of pollutant concentrations are high, since the pollutants are mixed with air confined to a narrow layer. With a large mixing depth, pollutants are diluted by mixing with air over a thicker layer, resulting in lower ground concentrations.

When one examines vertical temperature soundings taken over land in the early morning during clear skies and winds less than about 10 mph, a ground based inversion is normally found. As this inversion begins to dissipate shortly after sunrise, the vertical temperature gradient approaches or exceeds the adiabatic lapse rate over an increasingly thicker layer. As a result, the lowermost layer is unstable but is capped by an inversion. Pollutants in this unstable layer from the ground upward are uniformly mixed.

Thus, the mixing depth must undergo diurnal variations. Information on the behavior of the mixing depth is useful in forecasting air pollution levels or devising strategies for incident control. Continuous measurements of the mixing depth over rural as well as urban areas or during pronounced convection would assist in gaining a fundamental insight into those meteorological processes of importance to the air pollution problems.

It is therefore an object of this invention to provide an improved system for measuring the height of the aerosol layer.

Another object of this invention is to provide a system for measuring the height of the aerosol layer which does not require physical access to the top of the aerosol layer.

Another object of this invention is to provide a system for measuring the height of the aerosol layer wherein the measurement is accomplished from ground or near ground level.

Another object of this invention is to provide a system for measuring the height of an aerosol layer which will provide an instantaneous measurement of the aerosol layer height.

In practicing this invention, a plurality of pyrheliometers are positioned with a known vertical displacement between them. By measuring the intensity of solar radiation received by the pyrheliometers, the height of the aerosol layer can be measured. The vertical distance between the pyrheliometers can be very much less than the height of the aerosol layer so that the pyrheliometers could be, for example, positioned at the top and bottom of a building.

In one embodiment, one pyrheliometer is positioned at the bottom of a building and the second at the top of a building. Measurements are made of the intensity of solar radiation received by the pyrheliometers at two zenith distances. From these measurements the height of the aerosol layer can be calculated, assuming that the aerosol layer is substantially homogeneous.

In a second embodiment, a pair of pyrheliometers are placed at the top and bottom of the building. Each of the pyrheliometers of a pair measures intensity at a different wave length. One pyrheliometer of each pair measures the intensity of the solar radiation at a first wave length and the other pyrheliometer measures the intensity of the solar radiation at a second wave length. Using these measurements, an instantaneous calculation of the height of the aerosol layer can be made. The calculations can be made for a homogeneous aerosol layer or an aerosol layer which varies linearly.

In a third embodiment of the invention, single pyrheliometers are placed at the top and bottom of a building and a third pyrheliometer is placed midway between the first two pyrheliometers. The intensity of solar radiation received by each of the pyrheliometers can be used to calculate the height of the aerosol layer for both a homogeneous aerosol layer and a linearly varying aerosol layer.

Another embodiment uses two measuring devices which are displaced horizontally with the radiation being directed from the site of a first measuring device to a second measuring device by means of a mirror. Where aerosol layers are separated by clear areas, a pair of measuring devices viewing a common volume can be used to determine the height of the mixing layers.

The invention is illustrated in the drawings, of which:

FIG. 2 is a drawing of a system using two pairs of pyrheliometers vertically displaced in which one pyrheliometer of each pair receives radiation at a first wave length and the other pyrheliometer of each pair receives radiation at a second wave length;

FIG. 3 is a drawing of a system for measuring the height of an aerosol layer using three pyrheliometers vertically displaced;

FIG. 4 is a block diagram of an analog computer for calculating the measurements of the system of FIG. 2;

DETAILED DESCRIPTION OF THE INVENTION

The normal constituents of the atmosphere, oxygen, nitrogen, water vapor, ozone, carbon dioxide, and aerosols attenuate solar radiation. Attenuation is caused to some extent by absorption but to a larger extent by scattering.

Measurements of the attenuation of solar radiation within a given layer may be determined by comparing the radiation readings at the top and bottom of the layer. Three or four pyrheliometers at different levels would provide information on the variation of attenuation with height, which in turn would be related to the vertical distribution of aerosol.

If we assume that in the lower layers above ground the pollutant is approximately uniformly mixed or changes slowly with height up to the top of the aerosol layer, but then falls sharply, we can determine the effective height of the aerosol layer from the readings of pyrheliometers at two or three levels.

Figure 1:
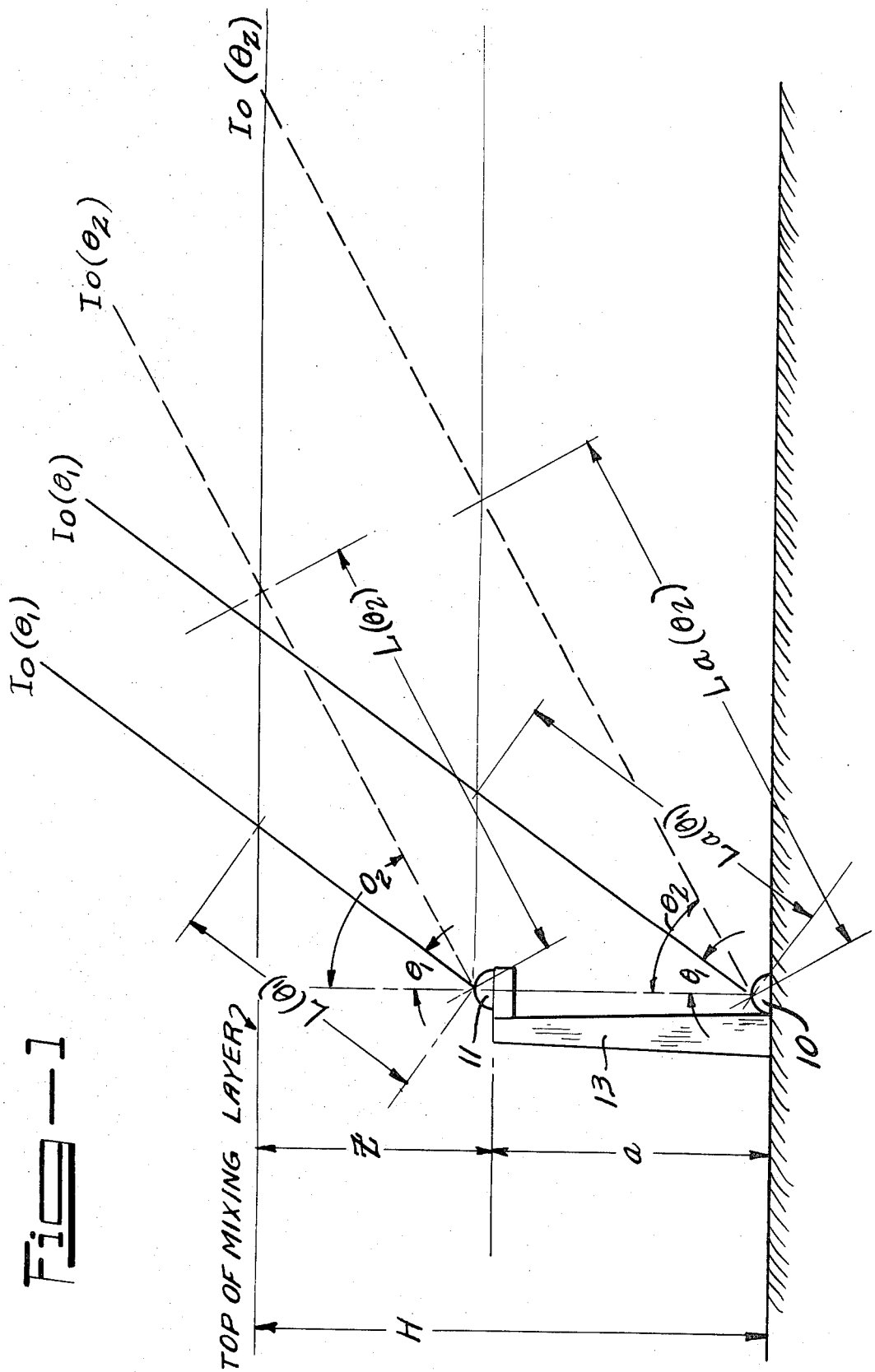
FIG. 1 illustrates a system for measuring the height of an aerosol layer using two pyrheliometers vertically displaced.

Referring to FIG. 1, there is shown a method in which a pyrheliometer 10 is located at the ground and a pyrheliometer 11 is positioned on the rooftop of a building 13. The vertical distance between pyrheliometers 10 and 11 is given as $a$. Readings are taken with the radiation at different zenith distances, for example, solar radiation with the readings 1 hour apart. It is assumed that the mixing depth has changed little during this period.

The intensity of the solar beam passing from the top of the atmosphere to the top of the building on which the upper pyrheliometer 11 is mounted for a solar zenith angle of $\theta_1$ may be given by $$I_T(\theta_1) = I_o(\theta_1) \exp\{-\mu L(\theta_1)\}, \quad (1)$$

and for a solar zenith angle of $\theta_2$, the equation becomes $$I_T(\theta_2) = I_o(\theta_2) \exp\{-\mu L(\theta_2)\}, \quad (2)$$

where $I_T(\theta_1)$ = intensity of all band solar radiation at top of building 13 with the sun's zenith distance $\theta_1$ $I_T(\theta_2)$ = intensity of all band solar radiation at top of building 13 with the sun's zenith distance $\theta_2$ $\theta_1$ = solar zenith distance in radians at initial time $\theta_2$ = solar zenith distance in radians at time of second reading $I_o(\theta_1)$ = intensity of normal incidence solar radiation at top of atmosphere with the sun's zenith distance $\theta_1$ $I_o(\theta_2)$ = intensity of normal incidence solar radiation at top of atmosphere with the sun's zenith distance $\theta_2$ $T$ = subscript representing instrument on rooftop of building serving as a platform $\mu$ = attenuation coefficient in meters$^{-1}$. This coefficient is the sum of the absorption and scattering coefficients $L(\theta_1)$ = length of solar beam from top of aerosol layer to uppermost pyrheliometer 11 with solar zenith distance $\theta_1$ $L(\theta_2)$ = length of solar beam from top of aerosol layer to uppermost pyrheliometer 11 with solar zenith distance $\theta_2$.

Similar equations for pyrheliometers at ground level are $$I_B(\theta_1) = I_o(\theta_1) \exp\{-\mu[L(\theta_1) + L_a(\theta_1)]\}. \quad (3)$$

$$I_B(\theta_2) = I_o(\theta_2) \exp\{-\mu[L(\theta_2) + L_a(\theta_2)]\} \quad (4)$$

where $B$ = subscript which refers to the bottom of the building $L_a(\theta_1)$ and $L_a(\theta_2)$ = length of solar beam from top to bottom of building $L_a(\theta_1) = a \sec \theta_1$.

Dividing Equation (1) by Equation (3) we have $$\frac{I_T(\theta_1)}{I_B(\theta_1)} = \frac{I_o(\theta_1)}{I_o(\theta_1)} \exp\{\mu a \sec \theta_1\} \quad (5)$$

$$\mu = \frac{\ln[I_T(\theta_1)/I_B(\theta_1)]}{a \sec \theta_1}. \quad (6)$$

Dividing Equation (3) by Equation (4) we have $$\frac{I_B(\theta_1)}{I_B(\theta_2)} = \frac{I_o(\theta_1)}{I_o(\theta_2)} \exp\{-\mu[L(\theta_1) + L_a(\theta_1) - L(\theta_2) - L_a(\theta_2)]\}. \quad (7)$$

Since $I_o(\theta_1) = I_o(\theta_2)$ and $L(\theta_1) + L_a(\theta_1)$ and $L(\theta_2) + L_a(\theta_2)$ are $H \sec \theta_1$ and $H \sec \theta_2$, respectively, we have $$\ln \frac{I_B(\theta_1)}{I_B(\theta_2)} = -\mu H(\sec \theta_1 - \sec \theta_2), \quad (8)$$

where $H$ is the effective height of the mixing depth.

Combining Equations (6) and (8) and solving for $H$, we have $$H = \frac{a \sec \theta_1}{\sec \theta_2 - \sec \theta_1} \frac{\ln I_B(\theta_1) - \ln I_B(\theta_2)}{\ln I_T(\theta_1) - \ln I_B(\theta_1)}, \quad (9)$$

Referring to Fig. 2, there is shown a technique for obtaining mixing depth with pairs of pyrheliometers at each of two levels using two wave bands. A pair of pyrheliometers 16 and 17 are positioned at the bottom of building 19 and another pair 20 and 22 are positioned at the top of building 19. The vertical distance between the pairs of pyrheliometers is $a$. Through the use of filters, it is possible to measure the received solar radiation in a prescribed band. With pyrheliometers 16 and 20 operating, for example, at 400–450 nanometers and pyrheliometers 17 and 22 operating at 550–600 nanometers, it is possible to determine the height of the mixing depth at a single zenith distance of the sun. In selecting the two bands, it is desired that attenuation in one band be as large as possible and in the other as small as possible so that the difference $\mu(\lambda_1) - \mu(\lambda_2)$ is at a maximum.

Since we are dealing with a single zenith angle, the $\theta$'s will be omitted and we have $$I_T(\lambda_1) = I_o(\lambda_1) \exp\{-\mu(\lambda_1)L\} \quad (10)$$

$$I_T(\lambda_2) = I_o(\mu_2) \exp\{-\mu(\lambda_2)L\} \quad (11)$$

$$I_B(\lambda_1) = I_o(\lambda_1) \exp\{-\mu(\lambda_1)(L + L_a)\} \quad (12)$$

$$I_B(\lambda_2) = I_o(\lambda_2) \exp\{-\mu(\lambda_2)(L + L_a)\} \quad (13)$$

where $\lambda_1$ refers to the first wave length $\lambda_2$ refers to the second wave length.

Dividing Equation (10) by Equation (12) and taking the logarithm of both sides, we have $$\mu(\lambda_1) = \frac{\ln \frac{I_T(\lambda_1)}{I_B(\lambda_1)}}{a \sec \theta} \quad (14)$$

Similarly, $$\mu(\lambda_2) = \frac{\ln[I_T(\lambda_2)/I_B(\lambda_2)]}{a \sec \theta} \quad (15)$$

Dividing Equation (12) by Equation (13) and taking the logarithm of both sides, we have $$\ln[I_B(\lambda_1)/I_B(\lambda_2)] - \ln[I_o(\lambda_1)/I_o(\lambda_2)] = [\mu(\lambda_2) - \mu(\lambda_1)]H \sec \theta. \quad (16)$$

Solving for $H$ and making use of Equations (14) and (15), we have $$H = \frac{a\{\ln[I_B(\lambda_1)/I_B(\lambda_2)] - \ln[I_o(\lambda_1)/I_o(\lambda_2)]\}}{\ln[I_T(\lambda_2)/I_B(\lambda_2)] - \ln[I_T(\lambda_1)/I_B(\lambda_1)]} \quad (17)$$

Thus $H$, the effective height, is determined from known or measured quantities. The ratio $I_o(\lambda_1)/I_o(\lambda_2)$ is, of course, the ratio of the energy in the two selected wave bands and is given in Physical Tables. The attenuation coefficient, $\mu$, varies directly with the mass of pollutant traversed per unit cross section or the concentration. If the concentration varies linearly with height, then the attenuation coefficient will also vary this way. Let us assume that $$\mu = kz,$$

where $k$ is a constant and $z$ is measured in the vertical direction with positive upward.

The basic differential equation then becomes (see FIG. 1)

$$dI/I = -\mu dL = -kzdL = -kz \sec\theta\, dz. \quad (18)$$

Integrating between the limits of the top of the building and the top of the aerosol layer, we have $$I_T = I_D \exp\{(-k \sec\theta/2)Z^2\}, \quad (19)$$

where $I_D$ = intensity of solar radiation at the top of the aerosol layer and $z$ is measured from the top of the layer.

If we express $$I_D = I_o \exp\{-\alpha\}$$

where $I_o$ = the solar constant for all-band radiation and $\alpha$ is a constant, we have $$I_T = I_o \exp\{-\alpha - (k/2)(\sec\theta)z^2\}. \quad (20)$$

Referring to FIG. 3, if three pyrheliometers are used, each at a different level, it is possible to determine an effective height of the aerosol layer instantaneously and without filters under the assumption that the concentration decreases linearly with height. If we are dealing with a tall building 25, we may place a pyrheliometer 26 at the ground denoted by subscript B; a second pyrheliometer 28 at an intermediate level (M); and a third pyrheliometer 29 at the top (T).

We may then write $$I_T = I_o \exp\{-\alpha - (k/2)(\cos\theta) L^2\} \quad (21)$$

$$I_B = I_o \exp\{-\alpha - (k/2)(\cos\theta)(L+L_a)^2\} \quad (22)$$

$$I_M = I_o \exp\left\{-\alpha - \frac{k}{2}(\cos\theta)\left(L+\frac{L_a}{2}\right)^2\right\} \quad (23)$$

$$\ln(I_T/I_B) = (k/2)(\cos\theta)(2L\cdot L_a + L^2_a) = P \quad (24)$$

$$\ln\frac{I_T}{I_M} = \frac{k}{2}(\cos\theta)\left(L\cdot L_a + \frac{L^2_a}{4}\right) = Q \quad (25)$$

$$(k/2)(\cos\theta)(2L\cdot L_a + L^2_a) = P \quad (26)$$

$$(k/2)(\cos\theta)(4L\cdot 28a + L^2_a) = 4Q. \quad (27)$$

Solving Equations (26) and (27) for $k$, we have $$k = (4P - 8Q/\cos\theta\, L^2_a). \quad (28)$$

And solving for $L$, we have $$L = L_a \frac{4 \ln(I_T/I_M) - \ln(I_T/I_B)}{4 \ln(I_T/I_B) - 8 \ln(I_T/I_M)} \quad (29)$$

But $L = z \sec\theta$ and $L_a = a \sec\theta$ $$z = a \frac{4 \ln(I_T/I_M) - \ln(I_T/I_B)}{4 \ln(I_T/I_B) - 8 \ln(I_T/I_M)} \quad (30)$$

$$H = z + a$$

$$H = \frac{a}{4} \frac{3 \ln(I_T/I_B) - 4 \ln(I_T/I_M)}{\ln(I_T/I_B) - 2 \ln(I_T/I_M)} \quad (31)$$

Referring again to FIG. 2, assume a linear distribution and that the wave bands $\lambda_1$ and $\lambda_2$ are 400–450 and 550–600 nanometers. The same notation as above is used.

$$I_T(\lambda_1) = I_o(\lambda_1) \exp\left\{-\alpha - \frac{k(\lambda 1)}{2} L^2 \cos\theta\right\} \quad (32)$$

$$I_T(\lambda_2) = I_o(\lambda_2) \exp\left\{-\alpha - \frac{k(\lambda_2)}{2} L^2 \cos\theta\right\} \quad (33)$$

$$I_B(\lambda_1) = I_o(\lambda_1) \exp\left\{-\alpha - \frac{k(\lambda_1)}{2} (L+L_a)^2 \cos\theta\right\} \quad (34)$$

$$I_B(\lambda_2) = I_o(\lambda_2) \exp\left\{-\alpha - \frac{k(\lambda_2)}{2} (L+L_a)^2 \cos\theta\right\} \quad (35)$$

From Equations (32) and (33)

$$\ln\left[\frac{I_T(\lambda_1)}{I_T(\lambda_2)} \cdot \frac{I_o(\lambda_2)}{I_o(\lambda_1)}\right] = \frac{k(\lambda_2) - k(\lambda_1)}{2} (\cos\theta) L^2 \quad (36)$$

From Equations (34) and (35)

$$\ln\left[\frac{I_B(\lambda_1)}{I_B(\lambda_2)} \cdot \frac{(I_o\lambda_2)}{(I_o\lambda_1)}\right] = \frac{k(\lambda_2) - k(\lambda_1)}{2} \cos\theta (L+L_a)^2 \quad (37)$$

Dividing Equation (36) by Equation (37), we have $$\frac{\ln\left(\frac{I_T(\lambda_1)}{I_T(\lambda_2)} \cdot \frac{I_o(\lambda_2)}{I_o(\lambda_1)}\right)}{\ln\left(\frac{I_B(\lambda_1)}{I_B(\lambda_2)} \cdot \frac{I_o(\lambda_2)}{I_o(\lambda_1)}\right)} = S = \frac{L^2}{(L+L_a)^2} \quad (38)$$

Therefore, $$L = (L_a S^{1/2}/1 - S^{1/2}). \quad (39)$$

One must exercise care to see that the square root is taken of positive numbers only $$z + a = H = a + \frac{aS^{1/2}}{1 - S^{1/2}} = \frac{a - aS^{1/2} + aS^{1/2}}{1 - S^{1/2}} = \frac{a}{1 - S^{1/2}} \quad (40)$$

$$H = \frac{a\left[\ln\left(\frac{I_B(\lambda_1)}{I_B(\lambda_2)} \cdot \frac{I_o(\lambda_2)}{I_o(\lambda_1)}\right)\right]^{1/2}}{\left[\ln\left(\frac{I_B\lambda_1}{I_B\lambda_2} \cdot \frac{I_o(\lambda_2)}{I_o(\lambda_1)}\right)\right]^{1/2} - \left[\ln\left(\frac{I_T(\lambda_1)}{I_T(\lambda_2)} \cdot \frac{I_o(\lambda_2)}{I_o(\lambda_1)}\right)\right]^{1/2}} \quad (41)$$

Thus, H, the aerosol layer depth, is determined from measured quantities for the case when the extinction coefficient varies linearly with height.

Referring to FIG. 4, there is shown an analog system which can be used to compute the height of the aerosol layer H as a result of the measurements taken by the system shown in FIG. 2. Referring to FIG. 2, the measurements are:

$I_B(\lambda_1)$ which is the input of operational amplifier 32, $I_B(\lambda_2)$ which is the input of operational amplifier 33, $I_T(\lambda_2)$ which is the input of operational amplifier 34, and $I_T(\lambda_1)$ which is the input of operational amplifier 35.

The outputs of operational amplifiers 32–35 are $K_e$ times the natural logarithm of the input function. The output of operational amplifier 32 is coupled to the minus input of differential amplifier 38 and the output of operational amplifier 33 is coupled to the plus input of differential amplifier 38. An additional input to a minus input of differential amplifier 38 is the function $$K_e \ln \frac{I_0(\lambda_1)}{I_0(\lambda_2)}$$

which can be obtained from physical tables. Differential amplifier 38, operating in a known manner, develops the output function $$K_e \ln \frac{I_B(\lambda_1)}{I_B(\lambda_2)} - K_e \ln \frac{I_0(\lambda_1)}{I_0(\lambda_2)}$$

which is the input of divider 44. The output of operational amplifier 33 is coupled to the plus input of differential amplifier 39 and the output of operational amplifier 34 is coupled to the minus input of differential amplifier 39. Differential amplifier 39 develops the output function $$K_e \ln \frac{I_T(\lambda_2)}{I_B(\lambda_2)}$$

The output of operational amplifier 32 is coupled to a plus input of differential amplifier 40 and the output of operational amplifier 35 is coupled to the minus input of differential amplifier 40. The output functions of operational amplifiers 32 and 35 are combined in differential amplifier 40 to develop the function $$K_e \ln \frac{I_T(\lambda_1)}{I_B(\lambda_1)}$$

The output of differential amplifier 39 is coupled to the plus input of differential amplifier 43 and the output of differential amplifier 40 is coupled to the minus input of differential amplifier 43 which develops an output function $$K_e \left( \ln \frac{I_T(\lambda_2)}{I_B(\lambda_2)} - \ln \frac{I_T(\lambda_1)}{I_B(\lambda_1)} \right)$$

The output of differential amplifier 43 is coupled to divider 44. Divider 44 divides the output of differential amplifier 38 by the output of differential amplifier 43 and also multiplies the result by a constant $a$ to develop the output function $$\frac{(a)\left[ \ln \frac{I_B(\lambda_1)}{I_B(\lambda_2)} - \ln \frac{I_0(\lambda_1)}{I_0(\lambda_2)} \right]}{\ln \frac{I_T(\lambda_2)}{I_B(\lambda_2)} - \ln \frac{I_T(\lambda_1)}{I_B(\lambda_1)}}$$

which is equal to $H$, as shown by Equation (17).

The operational amplifiers 32–35 and the differential amplifiers 38–40 and 43 and divider 44 are all known circuits. A similar system can be constructed to calculate the height of the mixing layer H using any of the embodiments of this invention described herein.

The preceding development is based on an atmosphere in which the pollutants are distributed in height either uniformly or linearly. Under these conditions, it is possible to use pyrheliometers to determine the thickness of the aerosol layer. In every case, it was assumed that the instruments measuring solar radiation were on an equatorial mount and, therefore, pointing at the sun. All of the equipment discussed, including the equatorial mounts is available commercially off the shelf.

The technique described here is essentially a passive remote probe, but it would work best during cloudless daytime conditions. During cloudy conditions or during the night, it may be necessary to develop an active system in which a source of electromagnetic energy is used.

When conditions of severe pollution exist, an extensive anticyclone is generally present. With extensive high pressure areas, atmospheric subsidence is likely, with the result that little cloudiness is present. One may, therefore, expect to find that this system works well when needed during high pollution situations.

As indicated in the block diagram, FIG. 4, the information obtained from the pyrheliometers may be passed through an electronic circuit in which the output represents the height of the mixing layer. This output may be transmitted to a central control point, such as an air pollution control office, where a recording meter provides continuous readings of the height of the mixing depth.

Figure 5:
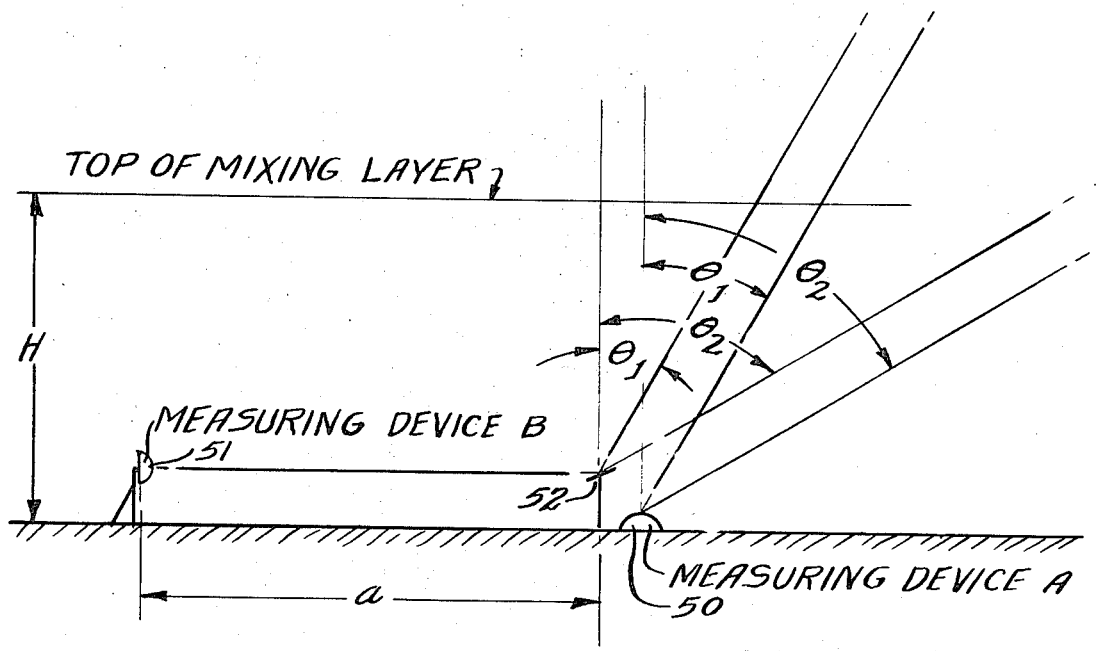
FIG. 5 illustrates a system for measuring the height of an aerosol layer using two measuring devices horizontally displaced.

Referring to FIG. 5, there is shown a method of measuring the height of the aerosol layer where a vertical mounting structure is not used. The method is similar to that of Fig. 1 except that the measuring devices are disposed horizontally instead of vertically. One measuring device 50 receives the radiation directly while the other radiation device 51 receives the radiation reflected from mirror 52 which is positioned alongside measuring device 50. The intensity of the radiation received by measuring device 51 is corrected for losses due to reflection from the mirror 52. The height of the aerosol layer H can be calculated from the formula:

$$H = a \frac{\sec \theta_1}{\sec \theta_2 - \sec \theta_1} \frac{\ln [I_B(\theta_1)/I_B(\theta_2)]}{\ln [I_A(\theta_1)/I_B(\theta_1)]} - a \quad (42)$$

Figure 6:
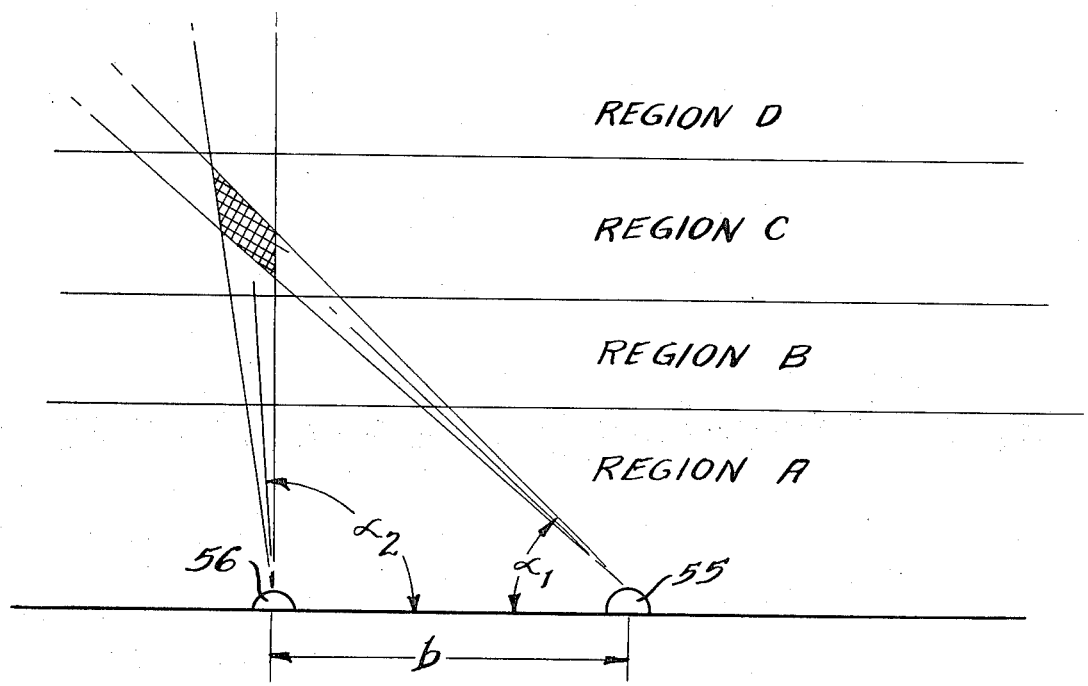
FIG. 6 illustrates a system for measuring the height of aerosol layers separated by clear layers.

Aerosols may occur in layers varying from tens to hundreds of feet in thickness. This distribution is shown in FIG. 6 where there are regions $A$, $B$, $C$ and $D$ where $A$ and $C$ have significant aerosol concentrations and layers $B$ and $D$ are relatively clear. Two measuring devices 55 and 56 are used, separated by a baseline $b$. The fields of view of the measuring devices 55 and 56 intersect in a common volume V and the covariance of the radiation flux observed by the two measuring devices is computed continuously. The height and extent of the aerosol layers may be determined from the covariance measurements as the common volume is allowed to change its elevation above ground. The height of the common volume is easily determined by trigonometric methods from measurements of the baseline $b$ and angles $\alpha_1$ and $\alpha_2$.

The pyrheliometer technique represents distinct advantages over the systems currently available for measuring the mixing depth, such as those with helicopters, fixed wing aircraft, or balloons. At best under current systems, only a few measurements per day can be obtained. With a system such as described in this paper, continuous measurements are provided. These, of course, would be invaluable for not only providing a better insight into meteorological processes, but as a valuable tool for incident control. While the system has been described using solar radiation, nighttime sky light or, under cloudy conditions, reflected infrared radiation could be used.

The embodiments of the invention in which an exclusive property or privilege is claimed are defined as follows:

1. The method of measuring the height of the atmospheric aerosol layer above a predetermined location, including the steps of:

a. positioning a first measuring device at said predetermined location and a second measuring device at an upper location vertically displaced a distance [a] above said predetermined location;

b. measuring the intensity of radiation which passes through the aerosol layer $[I_B(\theta_1)]$ at a first zenith angle $(\theta_1)$ with said first measuring device;

c. measuring the intensity of said radiation which passes through the aerosol layer $[I_T(\theta_1)]$ at said first zenith angle with said second measuring device;

d. measuring the intensity of said radiation which passes through the aerosol layer $[[I_B(\theta_2)]$ at a second zenith angle $\theta_2$ with said first measuring device; and e. calculating the height of the aerosol layer H according to the formula $$H = \frac{a \sec \theta_1}{\sec \theta_2 - \sec \theta_1} \frac{\ln I_B(\theta_1) - \ln I_B(\theta_2)}{\ln I_T(\theta_1) - \ln I_B(\theta_1)}$$

2. The method of measuring the height of the atmospheric aerosol layer of claim 1 wherein said radiation is solar radiation.

3. The method of measuring the height of the atmospheric aerosol layer above a predetermined location, including the steps of:

a. positioning a first measuring device at said predetermined location;

b. positioning a second measuring device at an upper location vertically displaced a distance $(a)$ above said predetermined location;

c. positioning a third measuring device at a mid location vertically displaced a distance $(a/2)$ above said predetermined location;

d. measuring the intensity of radiation which passes through the aerosol layer with said first measuring device $(I_B)$, said second measuring device $(I_T)$ and said third measuring device $(I_M)$; and e. calculating the height of the aerosol layer $H$ according to the formula $$H = \frac{a}{4} \frac{3 \ln (I_T/I_B) - 4 \ln (I_T/I_M)}{\ln (I_T/I_B) - 2 \ln (I_T/I_M)}$$

4. The method of measuring the height of the atmospheric aerosol layer of claim 3 wherein said radiation is solar radiation.

5. The method of measuring the height of the atmospheric aerosol layer above a predetermined location including the steps of:

a. positioning a first measuring device at said predetermined location and a second measuring device at a location horizontally displaced a distance $(a)$ from said predetermined location;

b. measuring the intensity of radiation which passes through the aerosol layer $[I_A(\theta_1)]$ at a first zenith angle $(\theta_1)$ with said first measuring device;

c. directing radiation which passes through the aerosol layer and is received at said predetermined location at said first zenith angle $(\theta_1)$ horizontally to said second measuring device and measuring the intensity of radiation received thereat corrected for losses in said direction $[I_B(\theta_1)]$;

d. directing radiation which passes through the aerosol layer as received at said predetermined location at a second zenith angle $(\theta_2)$ horizontally to said second measuring device and measuring the intensity of radiation received thereat corrected for losses in said direction $[I_B(\theta_2)]$; and e. calculating the height of the aerosol layer H according to the formula $$H = \frac{a \sec \theta_1}{\sec \theta_2 - \sec \theta_1} \frac{\ln [I_B(\theta_1)/I_B(\theta_2)]}{\ln [I_A(\theta_1)/I_B(\theta_1)]} - a$$

6. The method of measuring the height of the atmospheric aerosol layer of claim 5 wherein said radiation is solar radiation.

7. The method of measuring the height of the atmospheric aerosol layer including the steps of:

a. positioning a first measuring device at said predetermined location and a second measuring device at a location displaced horizontally a known distance from said first measuring device, each of said measuring devices having a restricted field of view with said fields of view being coplanar and intersecting in a common volume;

b. measuring the altitude angles of the fields of view of each of said first and second measuring devices to determine the height of said common volume;

c. scanning the field of view of at least one of said measuring devices to change the height of said common volume; and d. measuring the intensity of radiation received by said measuring devices and calculating the covariance of said received radiation to determine the presence and height of said aerosol layers.

8. The method of measuring the height of the atmospheric aerosol layer above a predetermined location including the steps of:

a. determining the ratio of radiation at the top of the aerosol layer at a first and second wave length $[I_0(\lambda_1)/I_0(\lambda_2)]$;

b. positioning a first pair of said measuring devices at said predetermined location with one of said first pair of measuring devices being responsive to radiation at said first wave length and the other of said first pair of measuring devices being responsive to radiation at said second wave length;

c. positioning a second pair of said measuring devices at an upper location vertically displaced a distance $(a)$ above said predetermined location with one of said second pair of measuring devices being responsive to radiation at said first wave length and the other of said second pair of measuring devices being responsive to radiation at said second wave length;

d. measuring the intensity of said radiation at said predetermined location at said first wave length $[I_B(\lambda_1)]$ and said second wave length $[I_B(\lambda_2)]$;

e. measuring the intensity of said radiation at said upper location at said first wave length $[I_T(\lambda_1)]$ and said second wave length $[I_T(\lambda_2)]$; and f. calculating the height of the aerosol layer H according to the formula $$H = \frac{a \{\ln [I_B(\lambda_1)/I_B(\lambda_2)] - \ln [I_0(\lambda_1)/I_0(\lambda_2)]\}}{\ln [I_T(\lambda_2)/I_B(\lambda_2)] - \ln [I_T(\lambda_1)/I_B(\lambda_1)]}$$

9. The method of measuring the height of the atmospheric aerosol layer of claim 8 wherein said radiation is solar radiation.

* * * * *